Jan. 22, 1924.

M. E. THOMPSON

ELECTROMAGNETIC COUPLING

Filed May 20, 1922

Inventor
Milton E. Thompson
By his Attorney Richard Eyre

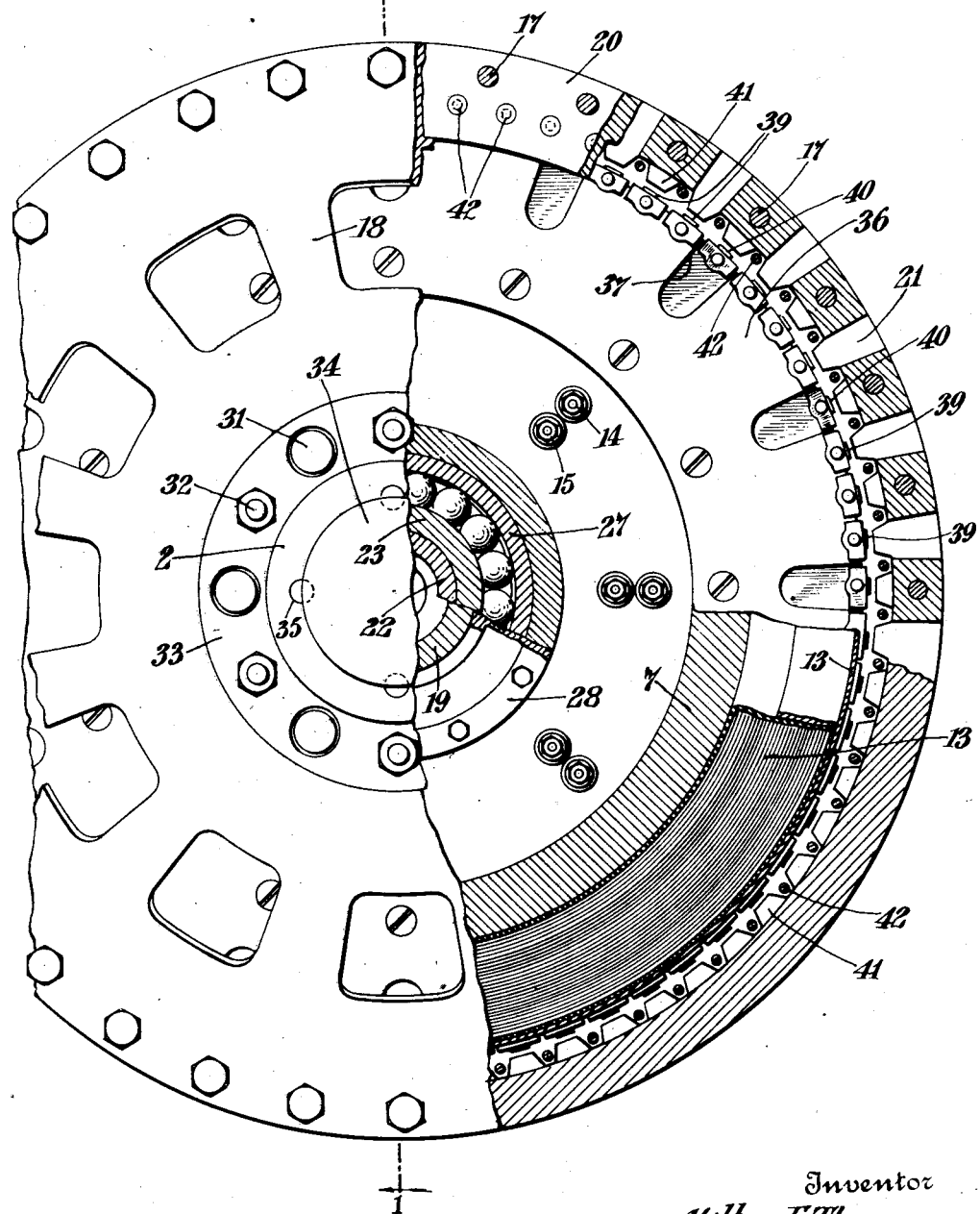

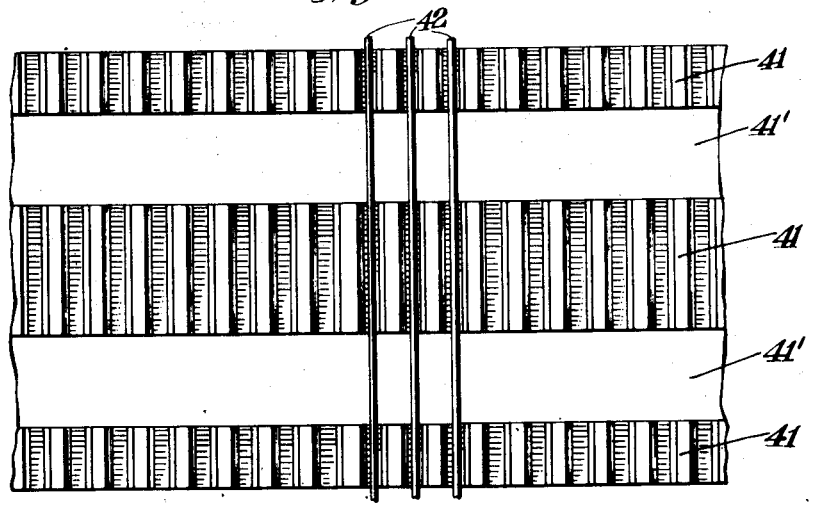
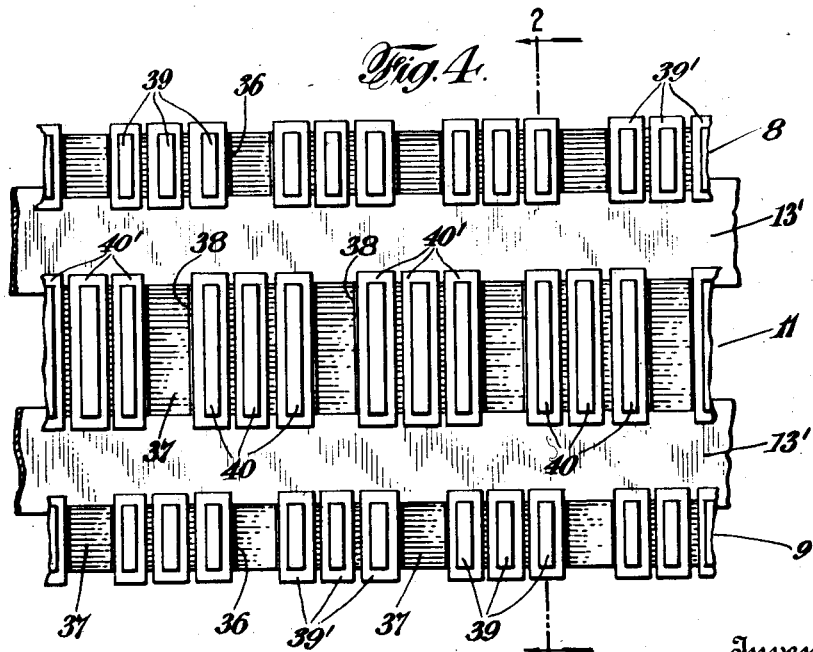

Patented Jan. 22, 1924.

1,481,655

UNITED STATES PATENT OFFICE.

MILTON E. THOMPSON, OF RIDGWAY, PENNSYLVANIA.

ELECTROMAGNETIC COUPLING.

Application filed May 20, 1922. Serial No. 562,290.

*To all whom it may concern:*

Be it known that I, MILTON E. THOMPSON, a citizen of the United States, and a resident of Ridgway, Elk County, State of Pennsylvania, whose post-office address is care of Ridgway Dynamo & Engine Company, same place, have invented certain new and useful Improvements in Electromagnetic Couplings, of which the following is a specification.

This invention relates to electrical coupler and power transmission mechanism.

The object of the invention generally is an electromagnetic coupler which enables a power shaft to be brought up to speed from standstill with the facility and efficiency desired in practical operation and which securely locks the driving and driven shafts electromagnetically together at synchronous speed after the power shaft picks up. A further object of the invention is a clutch construction and arrangement such that the magnetic leakage therefrom is reduced to a minimum and the effects thereof upon the bearings and other objects minimized.

I have conveniently illustrated my improved electrical coupler herein as embodied in a power transmission system of the general character set forth in my application Serial No. 346,292, filed December 20, 1919.

For a better understanding of the novel features of my invention, reference may be had to the accompanying drawings wherein:

Fig. 2 is a view on line 2—2 of Fig. 1 with certain parts broken away to show the interior construction;

Fig. 3 is a more or less diagrammatic drawing showing a development of the inner circumference of the outer member;

Fig. 4 is a similar view showing a development of the outside circumference of the inner chamber.

Figure 1:
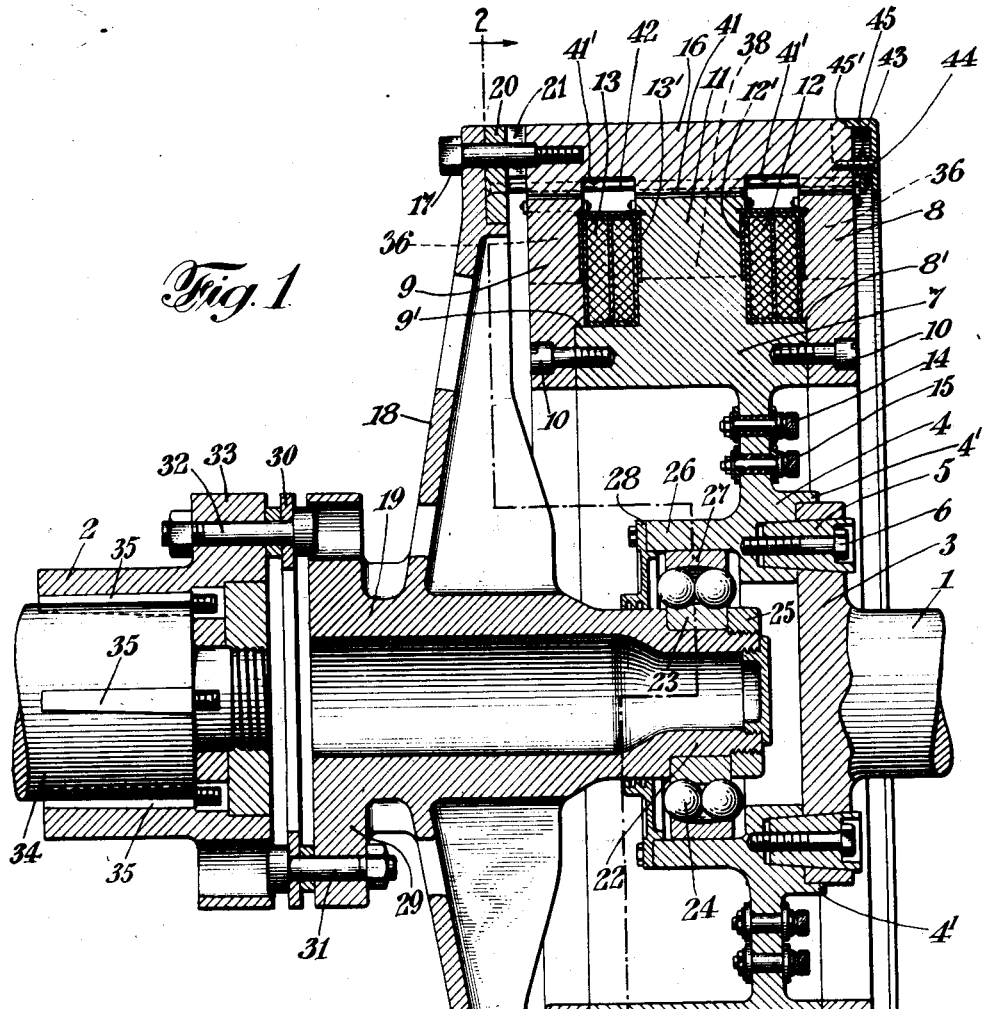
Fig. 1 is a vertical section on line 1—1 of Fig. 2 and along line 1—1 of Fig. 4.
Figure 5:
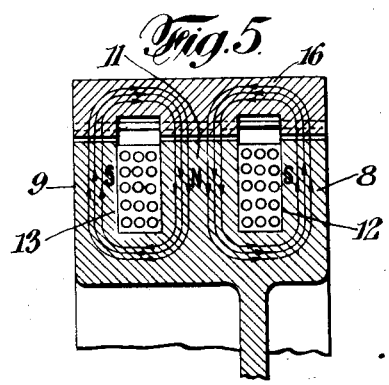
Fig. 5 is a diagrammatic view illustrating the magnetic circuit.

In Fig. 1 is shown a portion of an engine or other driven shaft 1 and a driving shaft 2. The shaft 1 has thereon a flange 3 to which is attached a circular spider member 4 the same being attached by holding members 5 inserted in registering holes in the flange 3 and member 4 and held therein by bolts 6. Annular shoulders 4' formed on the spider 4 fit over the periphery of flange 3 and assist the holding and aligning pins 5. Attached to the sides of the member 4 at the enlarged outer portion 7 thereof are two opposed ring-like magnetic members 8 and 9, one on each side thereof. These two annular members are milled off on their inner edges at 8' and 9' so as to fit over and be properly aligned with the outer edges of the member 7, and are held in place by screw bolts 10. Spaces are provided between the members 8 and 9 and the middle portion 11 (magnetic) of the member 4 in which are placed exciting coils 12 and 13, the coils being wound circumferentially around the part 7 and also wound relatively oppositely, that is, they are so wound with reference to the direction of currents flowing therein that they produce poles of like character in the member 11 and poles of like character in members 7 and 8, as indicated in Fig. 5. The coils 12 and 13 are excited by a current conducted thereto through suitable mechanism in contact with slip-rings 14 and 15, which are carried by but insulated from the spider 4. Each of the coils 12 and 13 comprises preferably two coils, and they are entirely enclosed, first by layers of insulation as shown and then by sheets of brass or bronze 12' and 13', the former fitting into the milled-out sides of magnetic members 8 and 9, and the latter being rabbetted into the member 11 on one side and members 8 and 9 on the other side.

Surrounding the circumference of the member attached to the engine shaft is a magnetic member 16 supported by bolts 17 from a flange member 18, which is integrally formed with an intermediate coupling shaft 19, a brass or bronze ring 20 of the shape shown being disposed between the edge of the flange 18 and the magnetic member 16 and having radial grooves 21 formed therein to provide ventilating openings around the periphery. The coupling shaft 19 continues inwardly past the flange in alignment with the shaft 1 and terminates in a reduced end 22 around which is provided a ball race 23 for accommodating balls 24 of a bearing. The race 23 is held in position by a nut 25 screw-threaded on to a portion of the reduced end. 22. The spider member 4 is likewise provided with a cylindrical sleeve or flange 26 which carries a spherical surfaced ball race 27 cooperating with the inner ball race 23 for accommodating the balls 24. Fastened to the inner end of flange 26 is a guard or closing member 28 which has an opening therein sufficient to afford compensating clearance to the shaft 19.

The member 19 has a flange 29 on the outer end thereof and a flexible coupling comprising one or more flexible rings 30 made of steel or other suitable material is fastened to the flange 29 by means of bolts 31 (only one shown). At intermediate and alternate circumferential points the ring 30 is fastened by bolts 32 to the flange 33 on the member 2, which is carried on a shaft 34 and prevented from rotating thereon by keys 35.

By reference to Figs. 2 and 4 it will be noted that the circumference of the magnetic member attached to the shaft 1 which, for convenience, will be hereafter referred to as the driving member (although either may be the driving shaft) is provided with a series of staggered polar projections 36 and 38 which are formed by milling out the members 8, 9 and 11 to provide empty spaces or pockets 37 between adjacent polar projections. From Fig. 4, which is a development of the circumference of the driven member, it will be noted that the outside members 8 and 9 have their polar projections 36 in line with each other but that the projections 38 which are formed on member 11 are staggered with relation to the poles 36.

The polar projections 36 and 38 are provided with flux localizing and concentrating teeth 39 and 40 respectively. The circumferential width of the teeth 39 and 40 is preferably the same and the lengths of the projections are coextensive with the thickness of the members 8 and 9 on the one hand and the member 11 on the other. The teeth or projections 39 and 40 are in line with each other and the first and last teeth of a projection 36 register respectively with the last and first teeth of two adjacent poles 38, leaving intermediate spaces where the teeth 39 and 40 alternate with each other. The teeth 39 and 40 are provided with short circuited collars (preferably non-magnetic and of copper) 39' and 40' respectively which are fastened securely thereto in any convenient manner as, for example, by suitable bolts.

Referring to Figs. 2 and 3, the outside member 16 is also provided with a plurality of magnetic projections or flux concentrating teeth 41 of the same circumferential width as the teeth 39 and 40. The teeth 41 are arranged uniformly and continuously around the inner circumference of the member 16, and are interrupted by two grooves 41' to form an intermediate row of teeth corresponding in dimensions and number to the teeth 40 on the inner member and two outer rows corresponding similarly to the teeth 39 on the inner member.

Placed in the slots between the projections or teeth 41 is an inductive winding 42 composed of brass, copper or other suitable conducting rods or bars of the desired size. These rods are connected at one end to the non-magnetic but conductive member 20 and at the other end to a conductive ring 43 which is adjustably supported by and insulated from a series of screw bolts 44 which are fastened in the member 16 and carry at their outer ends a shield or guard 45 fitting on to the milled-out edge 45' of the member 16. By reason of this construction the rods 42 constituting the inductive winding are allowed an opportunity to expand and contract as a result of temperature changes, the ring 43 sliding back and forth on the insulated bolts 44.

By reason of the continuous and uniformly arranged flux concentrating teeth 41 on the driven member 16, which have the same dimensional and angular relation as the projections 39 and 40 on the members 8, 9 and 11, and corresponding circumferential distribution thereto the driven member may be held in fixed relation to the driving member at any point when the two rotate at substantially the same speed and the coils 12 and 13 are energized sufficiently to cause them to become magnetically locked; there is no particular point or series of points along the circumference of the member 16 where the particular point or points on the circumference of the members 8, 9 and 11 must be in order that the coupling become properly magnetically locked.

The coupling devices illustrated herein and above-described may be assembled with the greatest facility. For example, in assembling the inner member, the clutch coils 12 and 13 may be axially inserted in position by the removal of the magnetic rings 8 and 9 and after the coils are in position these rings are replaced and the spider together with the magnetic members consisting of the members 8, 9 and 11 may be attached to the shaft 1 by means of the holding and aligning pins 5 and the bolts 6. The outer member of the clutch and the inner member may be brought together and the spherical ball-bearing consisting of the members 23, 24, 25 and 27 may be placed in position between the sleeve or housing 26 and the reduced end 22 of the coupling shaft 19. The guard 28 may then be inserted in position to close the bearing chamber.

The system, as a whole, compensates for both angular and lateral inaccuracies in alignments of the shafts 1 and 2 in a manner similar to that described in the aforementioned application, the arrangement being such that the coupling system is unimpaired even with an actual offsetting of the shafts 1 and 2.

The magnetic circuit is in the nature of a double circuit, as indicated more or less diagrammatically in Fig. 5, showing the production of magnetic flux around the coils 12 and 13 and through the members 7, 8, 9 and 11 in the directions as indicated by the arrows wherein juxtaposed similar poles are formed in between the coils 12 and 13, while poles of opposite polarity are formed at points beyond the coils, namely, in the members 8 and 9, the coils being wound relatively oppositely to effect this excitation. The result is the formation of three spaced circular poles about the inner member alternating in polarity. For example, assuming that two north poles are formed in between the coils then the two circular poles formed beyond the coils 12 and 13 would be south poles, each of these latter poles being of a less strength as compared to the central circular pole which consists of two adjacent like poles combined. Each of these circular poles of the inner member, however, is divided up into a multiplicity of like poles by cutting pockets therein at uniform distances around the periphery such, for example, as the pockets or open spaces 37. These pockets, therefore, form each circular pole into a multiplicity of polar projections or pole faces 36 and 38, the poles 36 forming the outer rows of poles and the poles 38 forming the central row of poles. These poles, however, are staggered so that the north poles alternate with the south poles in a circumferential direction. The effect of this arrangement is to produce alternating currents in the copper bars 42 when the two members are rotated relatively to each other. For example, when the conductors 42 are passing from a pair of poles 36 to a central pole 38 the induced current produced in the conductors is reversed in polarity, and vice versa.

The operation is as follows:

Assuming that shaft 1 is the driving shaft and that it is rotating at the required speed then the shaft 2 may be brought up to synchronous speed by simply exciting the coils 12 and 13 to the required extent. This shaft is picked up by a tractive force between the relatively rotating clutch members consisting of a combined magnetic drag and induced current pull which renders the clutch particularly efficient in that a maximum pull for a given weight and dimensions of a clutch is obtained. The tractive force is further improved by the provision of the multiplicity of what may be denominated flux localizing and concentrating teeth 39 and 40 on the inner member and the corresponding teeth on the outer member. I have found, for example, that the correlation of these various features has substantially increased the tractive force of a clutch not similarly equipped. Moreover, I not only obtain efficient operation and large torque between the relatively rotating members but the tractive force is an even and steady one unaccompanied by vibrational or jerky operation. Such stable operation I believe to be due to the combined effects of the multiplicity of staggered poles, flux localizing teeth, short circuited conductors 42 and the short circuited stabilizing metallic frames 39' and 40' which surround the teeth on the inner member. At substantially synchronous speed the clutch members become effectively electro-magnetically interlocked in any position that they happen to be in when that speed is reached, this being due to the uniform distribution of the magnetic poles and concentrating teeth about the members, the teeth on the inner member corresponding in number and dimensions to the teeth on the outer member. Moreover, as indicated above, since the coils 12 and 13 are wound relatively oppositely and are closely adjacent to each other as compared to their distance from the more remote objects their effect on the latter is reduced, if not entirely eliminated, the magnetic leakage being thereby reduced. For example, the spherical bearings of the magnetic clutch itself are substantially unaffected magnetically to any appreciable extent by the magnetic fields set up by the two circular coils 12 and 13 wound and having currents flowing therein as indicated above. It is noted, too, that the coils 12 and 13 are entirely enclosed by the copper or bronze plates 12' and 13' and are, therefore, securely shielded from atmospheres which might prove deleterious thereto. The electro-magnetic clutch herein may be designed for high current and flux densities and the desired tractive power obtained with a clutch of minimum weight and over all dimensions, and the novel features of this application contribute to the simplicity and effectiveness of such design.

I claim:

1. In a magnetic coupling a pair of energizing coils wound circumferentially of the coupling members and relatively oppositely, said coils being, relatively, remote from the axis of the coupling and close together.

2. A pair of power shafts, magnetic members connected therewith, a pair of energizing coils suitably wound and located to produce definite poles on one of said members and to oppose each other as to creation of leakage flux in either shaft.

3. A pair of power shafts and a magnetic coupling therefor, including magnetic coupling members and having a pair of energizing coils wound circumferentially and relatively oppositely and suitably located to produce definite poles in one of said members and to oppose each as to leakage flux through either shaft.

4. A magnetic coupling comprising a pair of relatively rotatable members, one of said members comprising an annular magnetic body and two magnetic rings adapted to be fitted with the main body and form a part of the magnetic circuit, with spaces therebetween for the reception of a pair of energizing coils and a pair of coils disposed within the spaces which are adapted to set up poles of opposed polarity in the main body and the magnetic rings.

5. In a magnetic coupling two relatively rotatable magnetic members, one of said members having mounted thereon a pair of energizing coils wound circumferentially thereof, said coils being spaced axially from one another and wound relatively oppositely to produce circular poles on the coupling members alternating in polarity in directions parallel to the axis and both of said clutch members having a plurality of uniformly distributed flux localizing and concentrating magnetic teeth uniformly distributed thereon.

6. A magnetic coupling comprising a pair of relatively rotatable magnetic clutch members, one of said members having imbedded therein a pair of circumferentially wound coils which are axially spaced from each other, said coils being wound relatively oppositely and adapted to produce alternating north and south poles in the clutch members and both of said relatively rotatable magnetic members being provided with a multiplicity of uniformly distributed flux localizing and concentrating teeth.

7. A magnetic coupling comprising a pair of relatively rotatable magnetic clutch members, one of said magnetic members having a multiplicity of staggered poles formed on the surface thereof which are adapted to cooperate with and magnetize the other member and a pair of circumferentially arranged energizing coils which are adapted to set up opposite polarities in the adjacent staggered poles.

8. A magnetic coupling comprising a pair of relatively rotatable magnetic clutch members, one of said members having a plurality of staggered polar projections formed on the periphery thereof, the other of said members having short circuited metallic bars imbedded therein, both of said members having a plurality of uniformly distributed flux localizing and concentrating teeth thereon which are coextensive with the width of the polar projections and a pair of energizing coils circumferentially arranged for setting up opposite polarities in the adjacent staggered polar projections.

9. A magnetic coupling comprising a pair of relatively rotatable magnetic clutch members, one of said members having three axially displaced circular polar projections about its periphery, said circular projections being cut away at points which are staggered with reference to each other and forming thereby a multiplicity of staggered polar projections on the periphery thereof and the other of said members having a plurality of conductor bars imbedded therein and short circuited and means for setting up opposite polarities in the adjacent staggered polar projections of adjacent rows.

10. In a magnetic coupling, a pair of relatively rotatable members, one of said members having a plurality of staggered poles on the periphery thereof and the other of said members having a plurality of short circuited conductor bars for the purpose set forth.

11. In a magnetic coupling, two relatively rotatable magnetic members, one of said members having two rows of circumferentially arranged polar projections, the projections in the two adjacent rows being offset with reference to each other and the other of said members having a plurality of short circuited conductor bars imbedded therein.

12. In a magnetic coupling, a pair of relatively rotatable magnet members, one of said members having a plurality of staggered poles on the periphery thereof and the other of said members having a plurality of short circuited conductor bars and said staggered poles being provided with flux localizing and concentrating teeth with short circuited stabilizing frames therearound.

13. A magnetic coupling comprising a pair of relatively rotatable members, one of said members having two spaced circular rows of north and south poles, respectively, formed thereon, and the other of said members having short circuited conductors of sufficient length to bridge the two rows of poles, each of these conductors alternating with the aforesaid north and south poles when the two members are rotated relatively to each other.

14. A magnetic coupling comprising a pair of relatively rotatable members, one of said members having two spaced circular rows of north and south poles, respectively, formed thereon, and the other of said members having short circuited conductor bars of sufficient length to bridge the two rows of poles, each of said conductor bars alternating with the north and south poles when the two members are rotated relatively to each other and having an intermediate position wherein the conductor is under both north and south poles.

15. A magnetic coupling comprising a pair of relatively rotatable members, one of said members having three axially displaced rows of circumferentially arranged poles disposed thereon and a pair of circumferentially wound energizing coils adapted to form poles in adjacent rows of opposite polarity, and the other of said members having closed circuited conductor bars cooperating with said north and south poles, said bars being of sufficient length to bridge the three axially displaced rows of poles and each of said bars alternating in position under the central row of poles and the outside rows of poles.

16. A magnetic coupling comprising a pair of relatively rotatable members, one of said members having three axially displaced rows of circumferentially arranged poles disposed thereon and a pair of circumferentially wound energizing coils adapted to form poles in adjacent rows of opposite polarity, and the other of said members having cooperating closed circuited windings thereon, the conductors thereof being of sufficient length to bridge the three rows of poles and each of said bars alternating with the poles of opposite polarity but having an intermediate position wherein it cooperates with poles of both polarity.

In testimony whereof I have signed my name to this specification.

MILTON E. THOMPSON.